US006263990B1

(12) United States Patent
Liu (10) Patent No.: US 6,263,990 B1
(45) Date of Patent: Jul. 24, 2001

(54) AUTO-CARRIAGE

(76) Inventor: Chieh-I Liu, 7th Fl., No. 19-1, Lane 222, Tunhwa N. Rd., Taipei (TW)

( * ) Notice: Subject to any disclaimer, the term of this patent is extended or adjusted under 35 U.S.C. 154(b) by 0 days.

(21) Appl. No.: 09/635,957

(22) Filed: Aug. 10, 2000

(30) Foreign Application Priority Data

Aug. 11, 1999 (TW) .............................................. 088213550

(51) Int. Cl.[7] .................................................... B60K 1/00
(52) U.S. Cl. .................. 180/65.1; 280/267; 280/93.504; 280/93.51
(58) Field of Search ................................. 180/65.1, 65.6, 180/59, 60, 61, 68.5; 280/263, 267, 93.51, 93.511, 93.504, 771, 778, 240, 93.502, 472, 494, 504

(56) References Cited

U.S. PATENT DOCUMENTS

| | | | | |
|---|---|---|---|---|
| 667,842 | * | 2/1901 | Ingalls ............................... | 280/93.51 |
| 741,587 | * | 10/1903 | Meden ................................ | 180/65.6 |
| 748,015 | * | 12/1903 | Roberts .................................. | 180/60 |
| 1,215,143 | * | 2/1917 | Green .................................. | 280/93.51 |
| 4,633,962 | * | 1/1987 | Cox et al. ............................. | 180/65.1 |

* cited by examiner

Primary Examiner—Brian L. Johnson
Assistant Examiner—Elaine Gort
(74) Attorney, Agent, or Firm—Thorp Reed & Armstrong, LLP (57) ABSTRACT

An auto-carriage has a first frame and a second frame pivotally connected to the first frame so that both the front wheels and the rear wheels of the carriage are able to maintain engagement to the ground at all times. Furthermore, a pair of unidirectional bearings are provided to distal ends of an axle, such that the carriage is able to change the moving direction easily. A first linkage connected to a secondary linkage through a universal joint enables the steering force of a user to convert to the driving force to the front wheel bracket so as to change the moving direction of the carriage.

3 Claims, 14 Drawing Sheets

FIG.10 ive views showing
AUTO-CARRIAGE

BACKGROUND OF THE INVENTION

1. Field of the Invention

The present invention relates to an auto-carriage, and more particularly to an auto-carriage having a first frame and a second frame pivotally connected with each other so as that the carriage is able to maintain engagement with the ground and a differential device enabling the carriage to change direction easily.

2. Description of Related Art

Pushcart, trolleys, strollers, carriages are all common transportation devices used in moving cargo from one place to another. All these transportation devices are manually operated and are not easy to be manipulated. In order to overcome the labor intensive problem of the conventional carriages or trolleys, an automated carrier is introduced to the market. The carrier is equipped with an engine so that not much of labor work is involved in the operation of the carrier. Furthermore, a transmission device is also equipped with the carrier, which enables the carrier to change the moving direction while in operation. However, this kind of carrier is complicated in structure and costy, which is not affordable by small & medium sized enterprises or normal operators.

It is therefore an objective of the invention to provide an improved carriage to mitigate and obviate the aforementioned problems.

SUMMARY OF THE INVENTION

The main objective of the invention is to provide an improved auto-carriage having sectioned bodies pivotally connected with each other, such that different bodies of the carriage are able to maintain engagement with the ground no matter what the situation of terrain is.

Another objective of the invention is that the auto-carriage is equipped with a differential device so as to enable the carriage to change direction while in movement.

Other objects, advantages and novel features of the invention will become more apparent from the following detailed description when taken in conjunction with the accompanying drawings.

DETAILED DESCRIPTION OF PREFERRED EMBODIMENT

Figure 1:
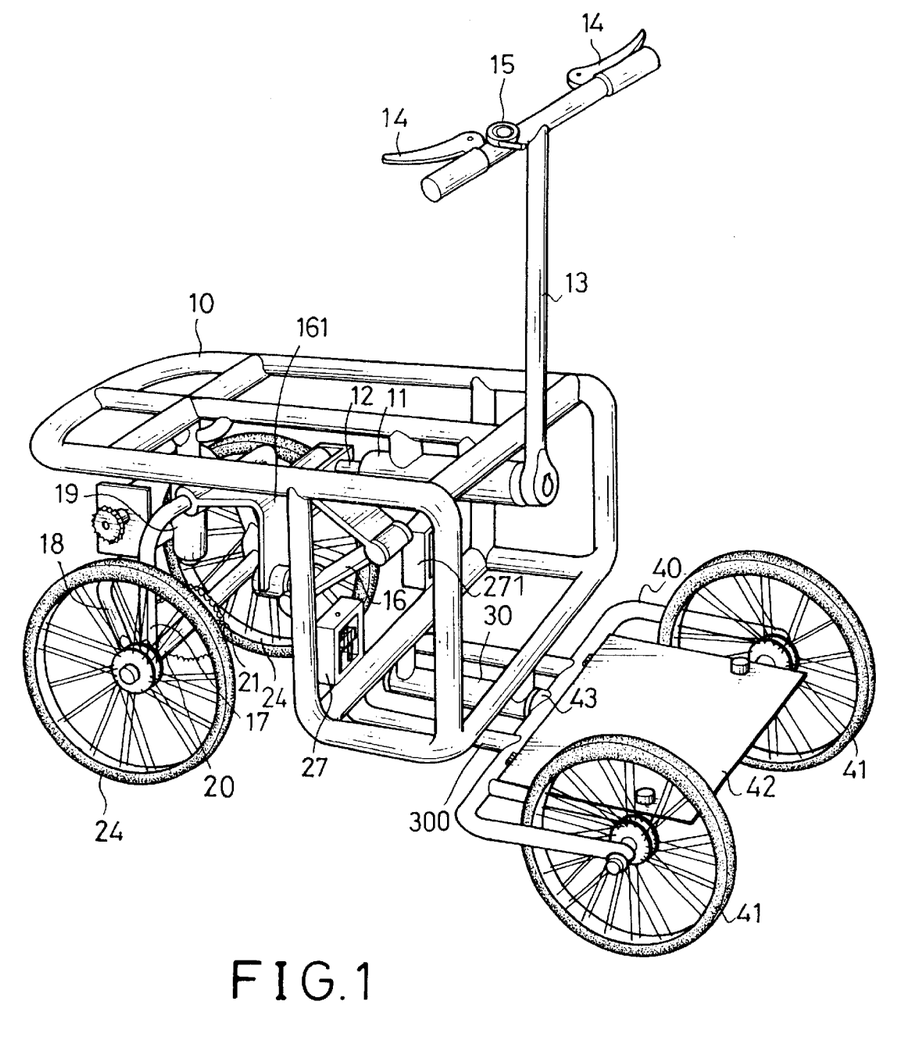
FIG. 1 is a perspective view showing the auto-carriage constructed in accordance with the present invention.
Figure 1A:
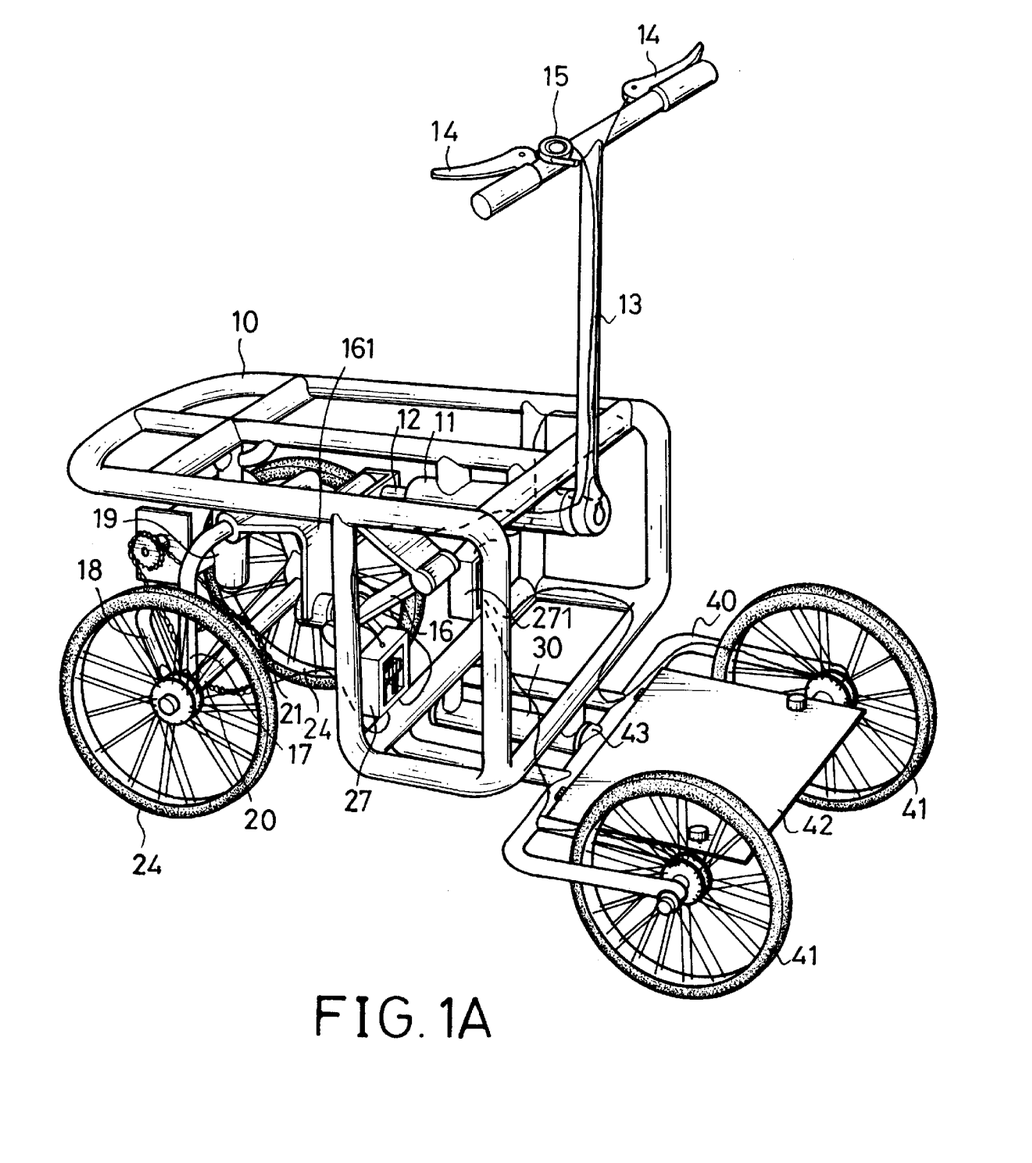
FIG. 1A is a perspective view showing the detailed structure of the brake system and the transmission system used in the auto-carriage of the invention.
Figure 2:
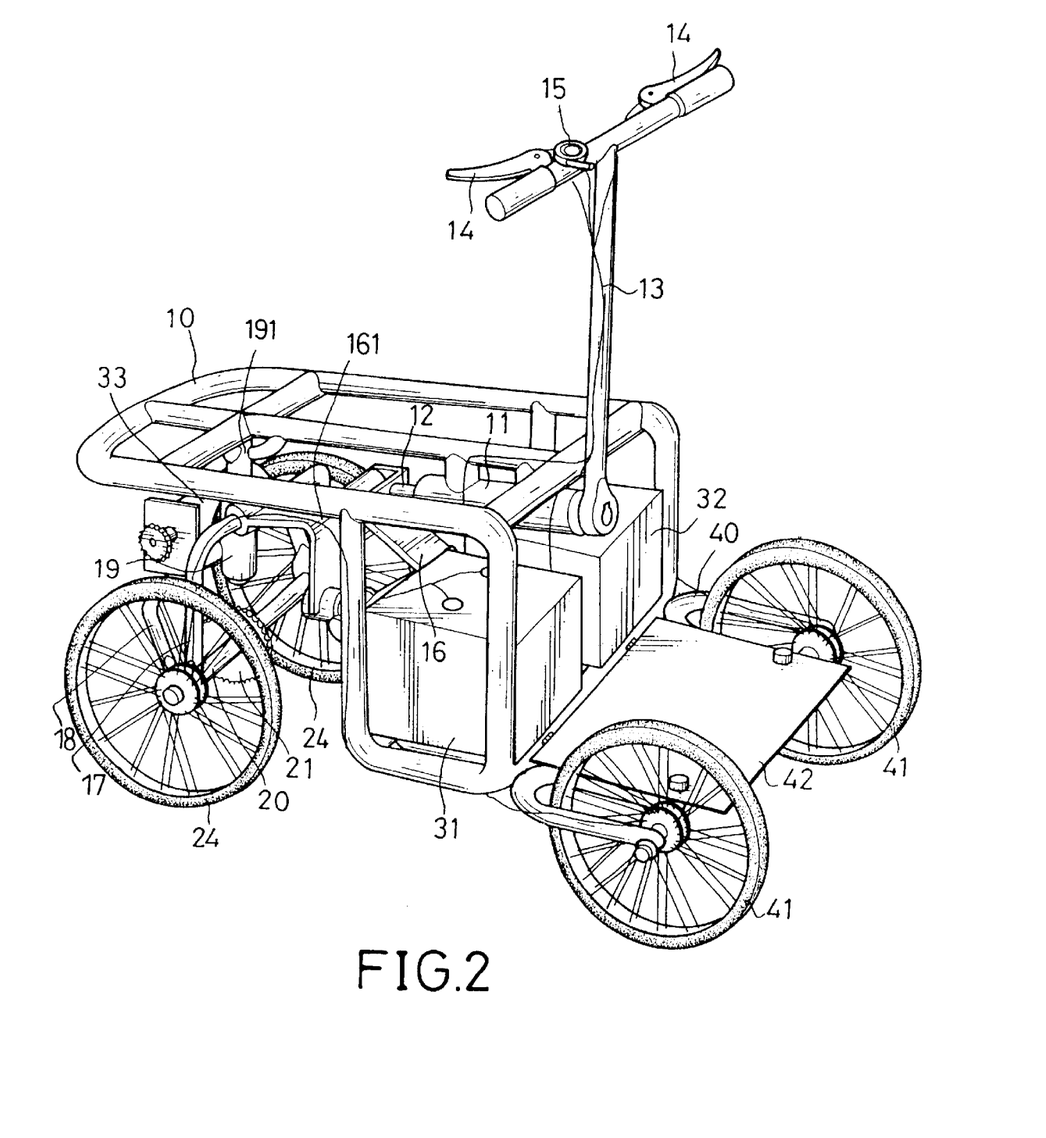
FIG. 2 is a perspective view showing another preferred embodiment of the invention, wherein the second body is secured with the first body.
Figure 2A:
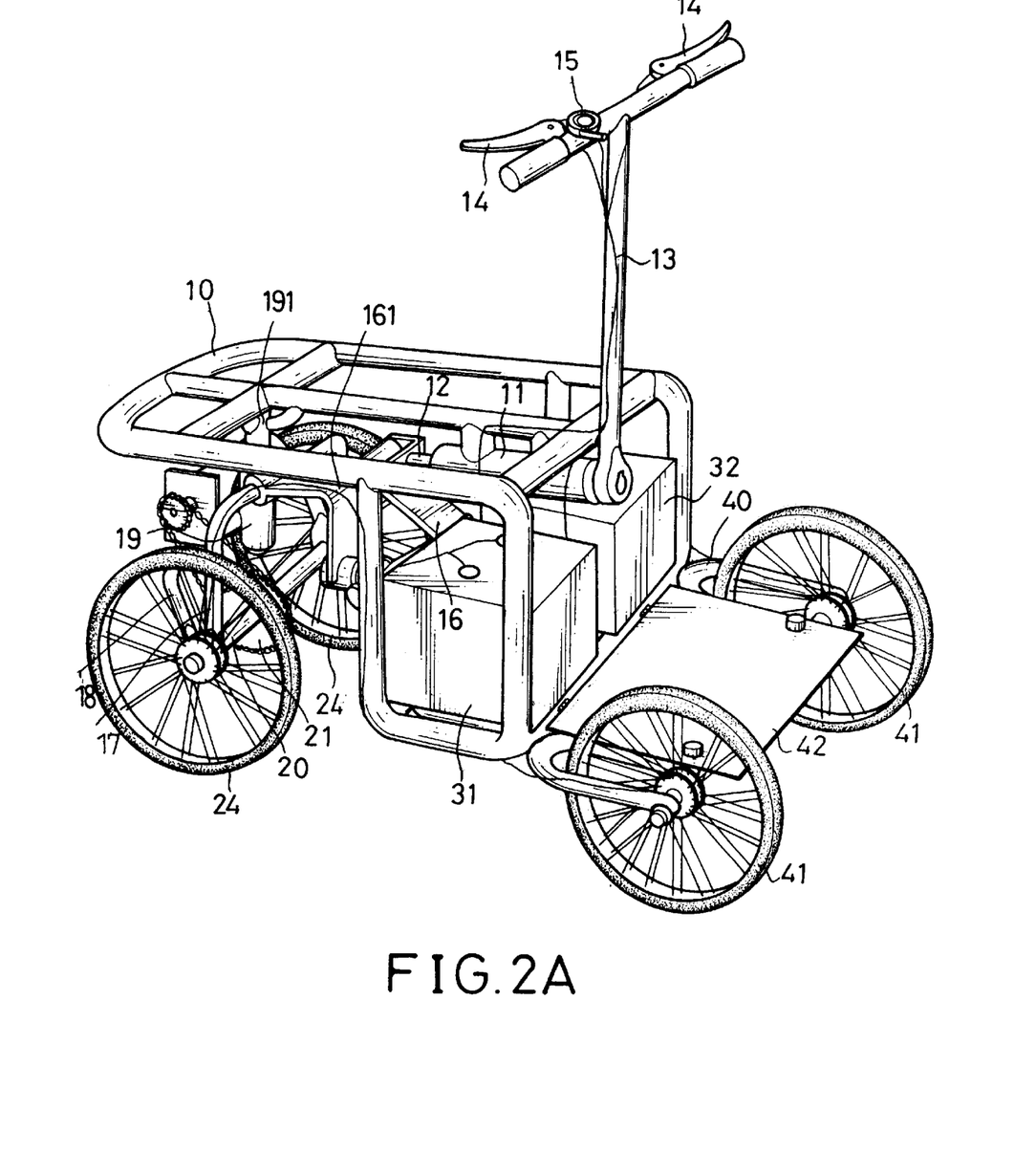
FIG. 2A is a perspective view showing that a chain is provided in the transmission system of the embodiment as shown in FIG. 2.
Figure 3:
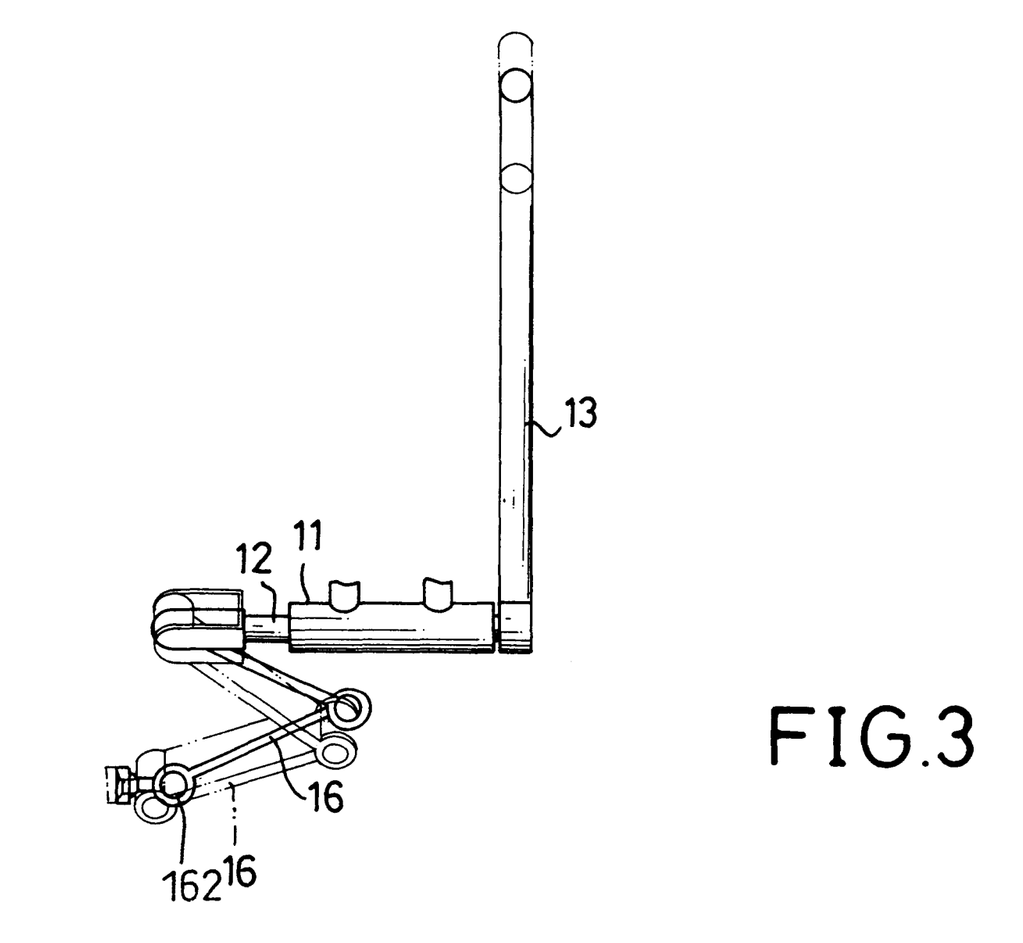
FIG. 3 is a side plan view showing the relationship between the steering bar and the linkage.
Figure 4:
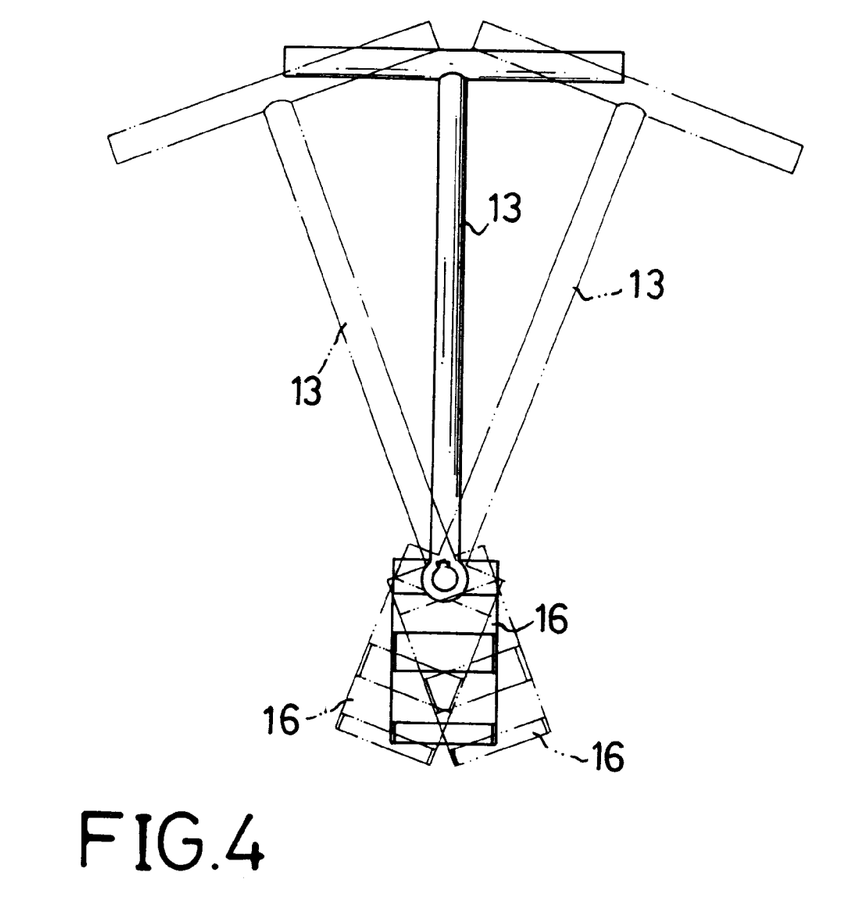
FIG. 4 is a schematic view showing the application of the steering bar in relation to the linkage.
Figure 5:
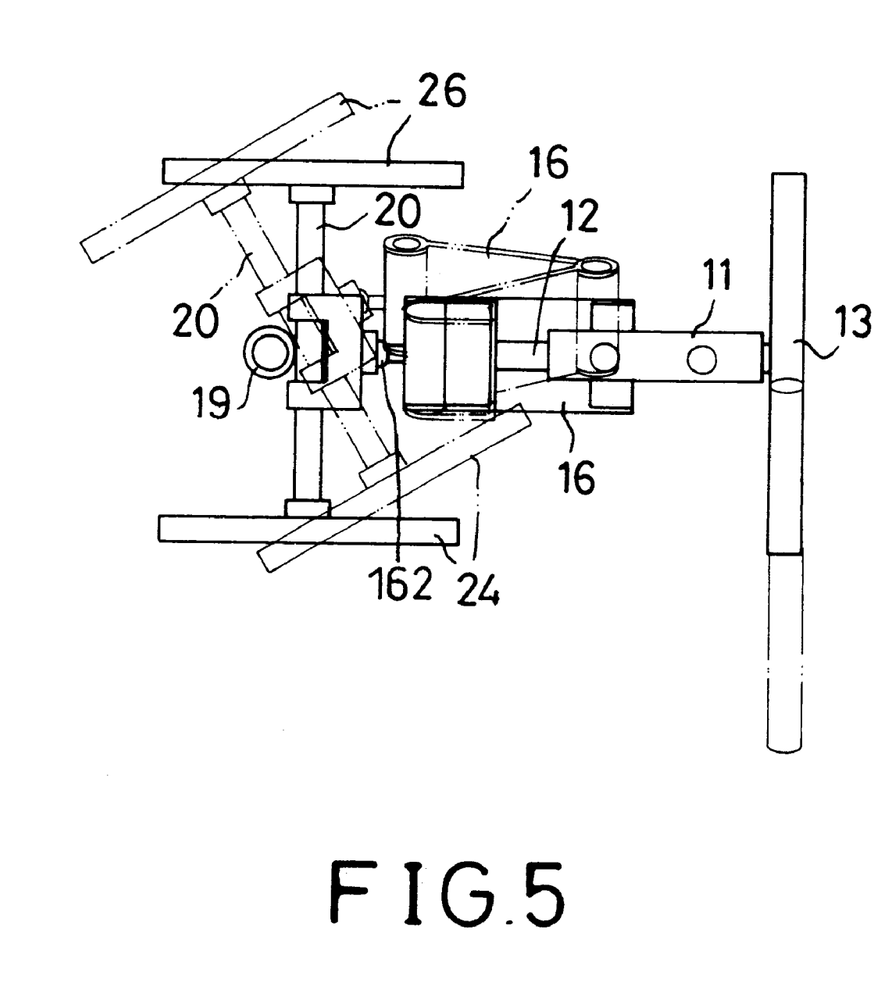
FIGS. 5 and 6 are schematic views showing movement the of the wheels in relation to the linkage.

Referring to FIG. 1, FIG. 1A, FIG. 2 and FIG. A, an auto-carriage has a first frame (10) and a second frame (40) pivotally connected to the first body (10). The first frame (10) centrally defined a space for carrying a load so that a user is able to transport the load from one place to another. Under the first frame (10), there is firmly provided with a cylinder (11) with a shaft (12) rotatably received therein and one end of the cylinder (11) is securely connected with a T-shaped steering bar (13). The steering bar (13) is provided with a pair of braking handles (14) for controlling the braking system (not shown) of the carriage of the invention and a control switch (15) for controlling the operation of the engine. Due to how the braking handles (14) is connected to the braking system and what type of the braking system is being not the focus of the invention, detailed description thereof is omitted. The other end of the shaft (12) is connected with a linkage (16). The linkage (16) is connected with a secondary linkage (161) by means of a universal joint (162) (as shown in FIG. 3). The secondary linkage (161) securely engages with a U-shaped front wheel bracket (17) that has an inclined support (18) integrally formed with the mediate portion of the front wheel bracket (17) through a cylindrical housing (19). Near the front end of the first frame (10) and corresponding to the cylindrical housing (10), a protrusion (191) integrally extends downward from the first frame (10), so that the protrusion (191) is able to be rotatably received in the cylindrical housing (19).

Figure 6:
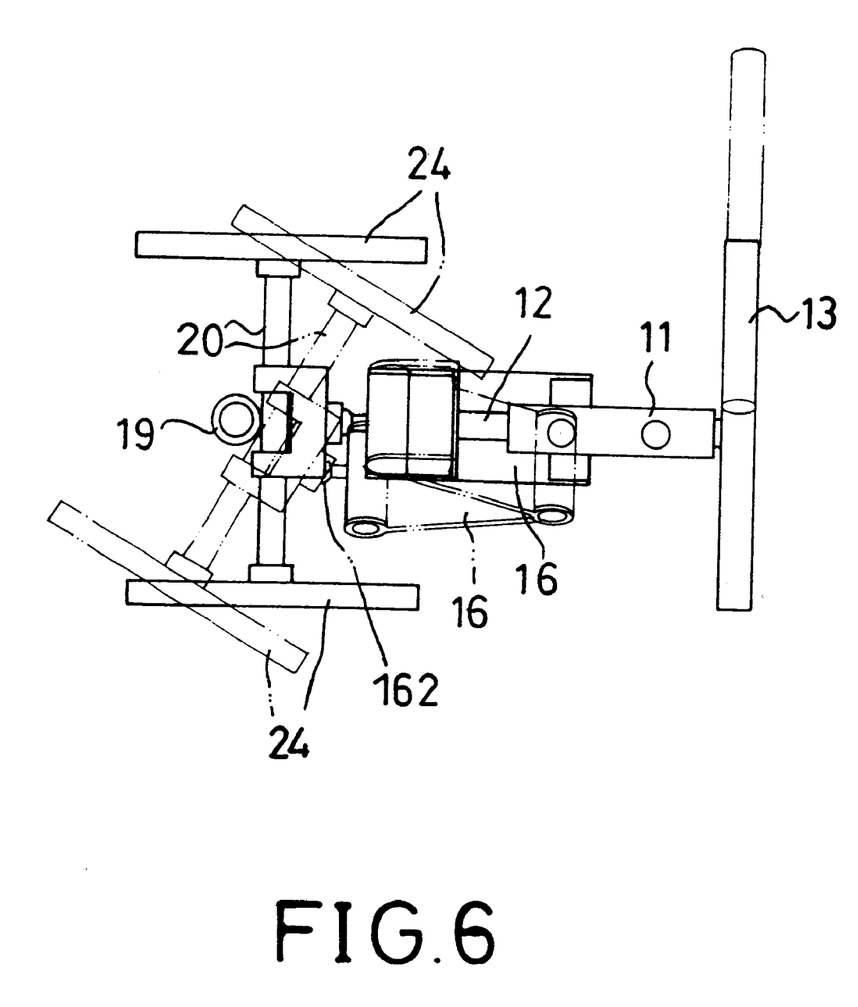
Figure 6A:
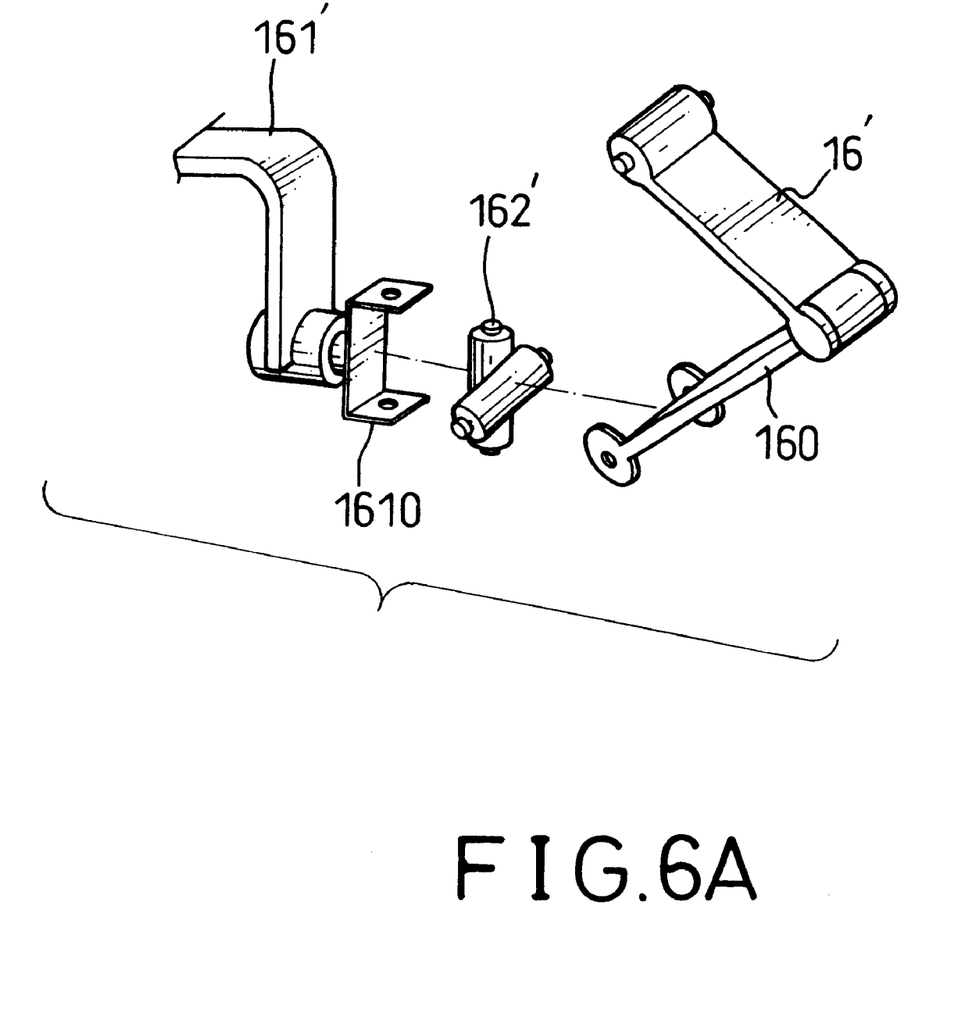
FIG. 6A is an exploded perspective view showing another preferred embodiment of the linkage and the joint.

Referring to FIGS. 3, 4, 5 and 6, it is noted that when the steering bar (13) is steered by a user, the linkage (16) is driven by the pivot of the shaft (12) to shift to a direction. By means of the universal joint (162), the driving force from the linkage (16) is transmitted to the secondary linkage (161) and then the secondary linkage (161) is shifted to an opposed direction in relation to the direction of the linkage (16). Because the secondary linkage (161) is securely connected with the front wheel bracket (17) and the front wheel bracket (17) is then securely connected with the inclined support (18), the driving force from the linkage (16) will drive the front wheel bracket (17) together with the support (18) to pivot in the same direction as that of the linkage (16). After a pair of front wheels (24) are rotatably mounted under the front wheel bracket (17), the pivotal movement of the front wheel bracket (17) together with the inclined support (18) will also drive the front wheels (24) to pivot. With reference to FIG. 6A, another preferred embodiment of a cross-head universal joint (162') is shown. Incorporating with the universal joint (162'), the linkage (16) has a connector (160) securely connected to the cross-head universal joint (162') and the secondary linkage (161') also has a connector (1610) securely connected to the universal joint (162'), such that the pivotal movement of the linkage (16') will drive the secondary linkage (161') to pivot and therefore drives the front wheel bracket (17) to pivot.

Figure 7:
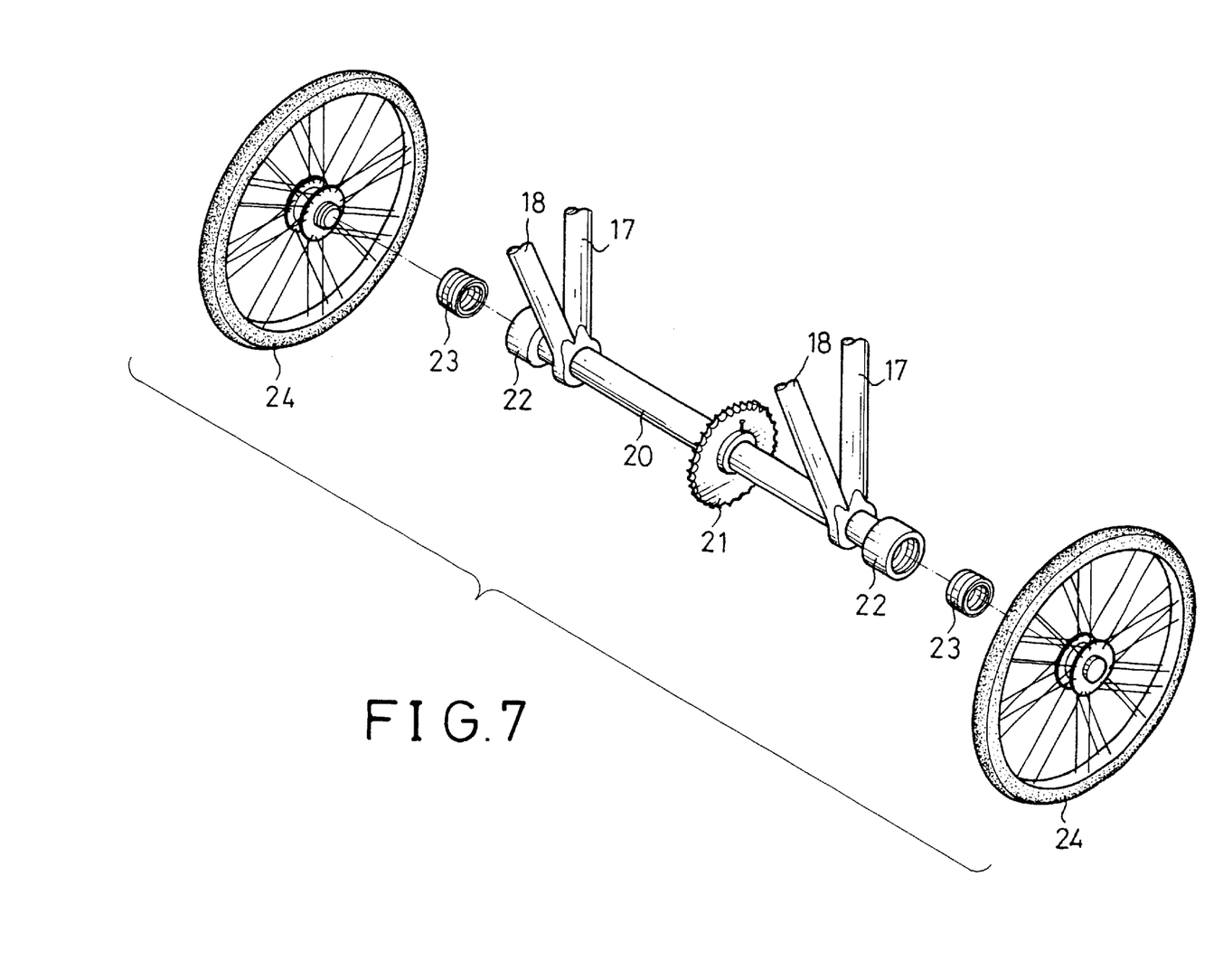
FIGS. 7 and 7A are exploded perspective views showing the transmission shaft and the differential device used in the carriage of the invention.
Figure 7A:
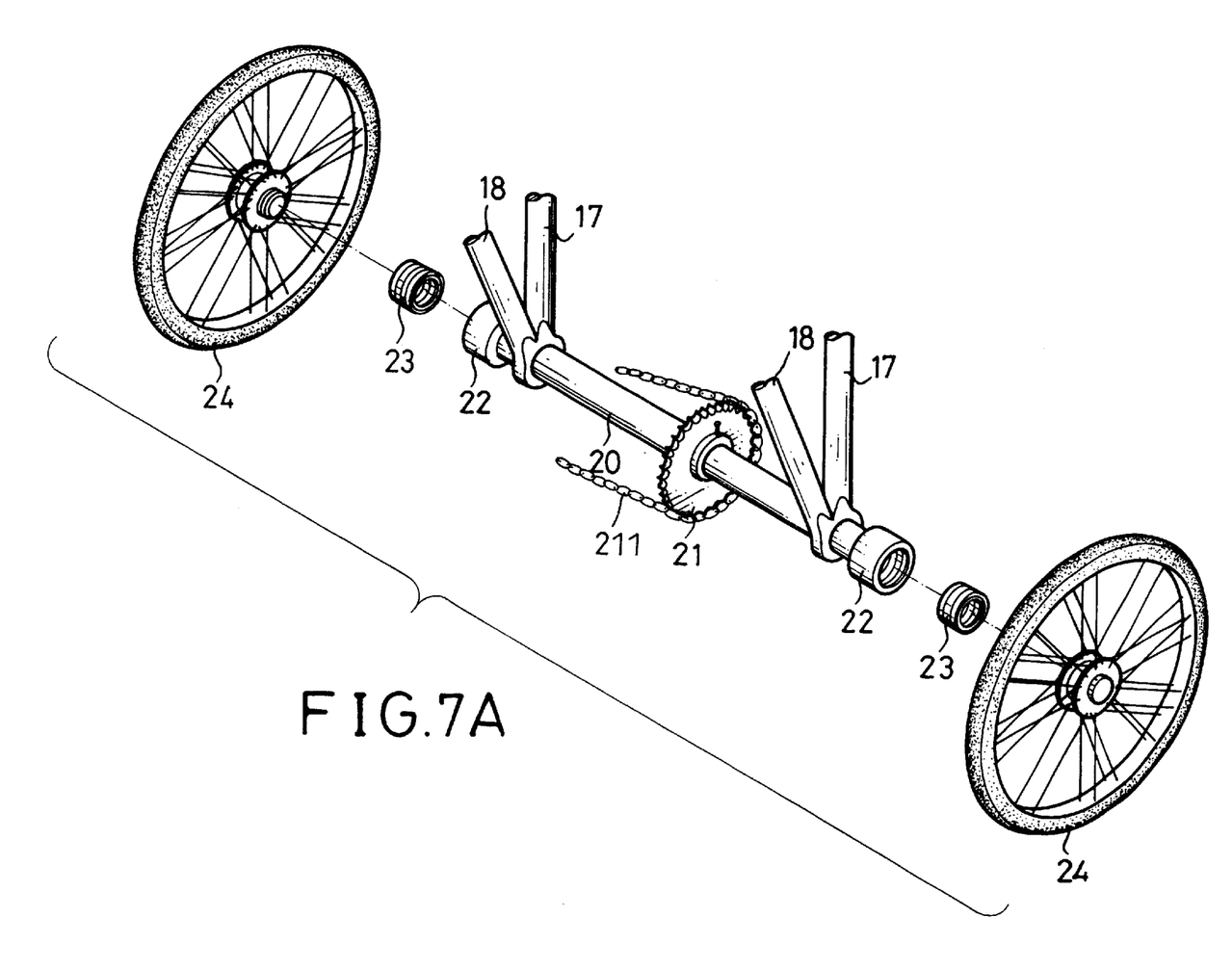
Figure 8:
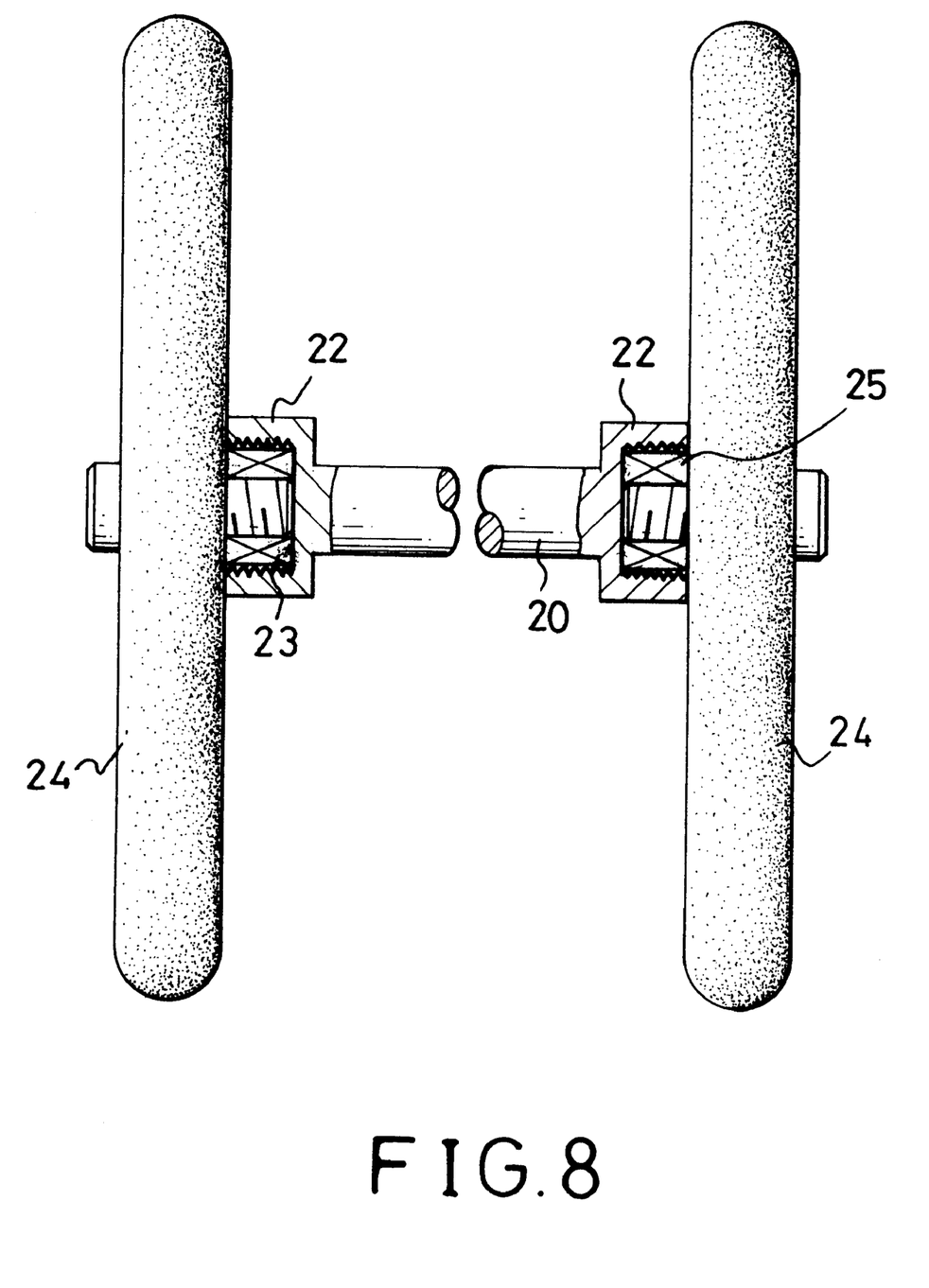
FIG. 8 is a front view showing the mounting of the differential device in the wheels of the carriage.

With reference to FIG. 7, FIG. 7A and FIG. 8, an axle (20) is provided to extend through joints between the front wheel bracket (17) and the inclined support (18). In the mediate portion of the axle (20) a gear (21) is fixedly mounted and having a chain (211) engaged and surrounded the gear (21). A sleeve (22) is securely and respectively mounted at two free ends of the axle (20) so that an unidirectional bearing (23) is able to be received in the sleeve (22) so as to function as a differential device to the front wheels (24). It is noted that when the carriage of the invention is moving toward a fixed direction, each of the unidirectional bearings (23) engages with the respective sleeve (22) so that there is no differential effect required. However, when the carriage of the invention is turning, one of the front wheels (24) rotates faster than that of the other, in this case, the unidirectional bearing (23) provided to the front wheel (24) that rotates slower than that of the other fails to engage with the sleeve (22). Accordingly, a differential effect is generated to the carriage to facilitate the changing of moving direction.

In order to facilitate the moving of the carriage of the invention, a power system is provided to the carriage. The power system includes a battery box (31) for receiving therein multiple batteries (not shown), a motor regulating device (32) and a motor (33). The motor shaft (not numbered) is connected to the gear (21) through the chain (211), such that when the motor (33) is in operation, the power of the motor (33) is able to be transmitted to the axle (20) to drive the rotation of the front wheels (24).

Figure 9:
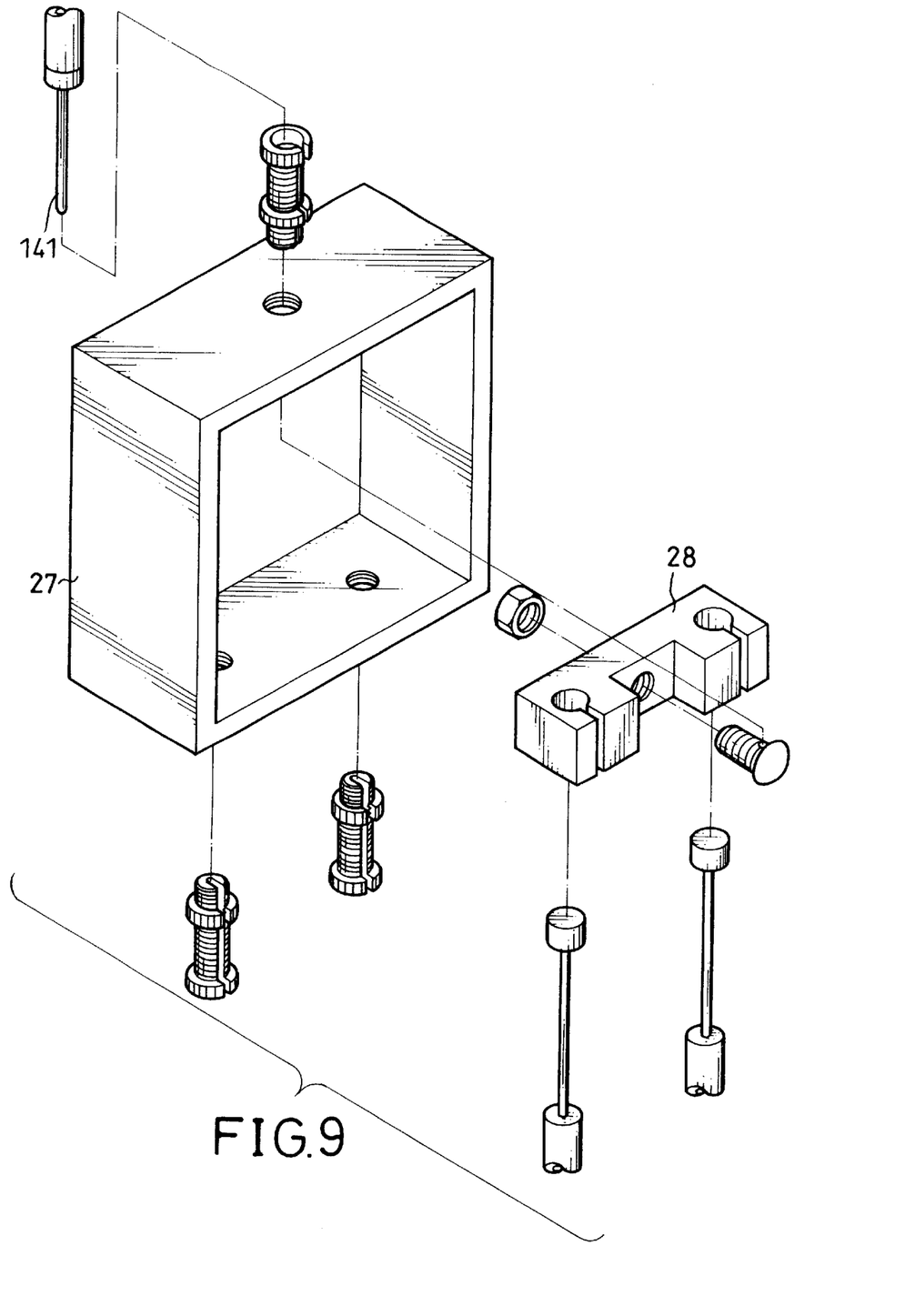
FIG. 9 is an exploded perspective view showing the brake system used in the carriage of the invention.
Figure 10:
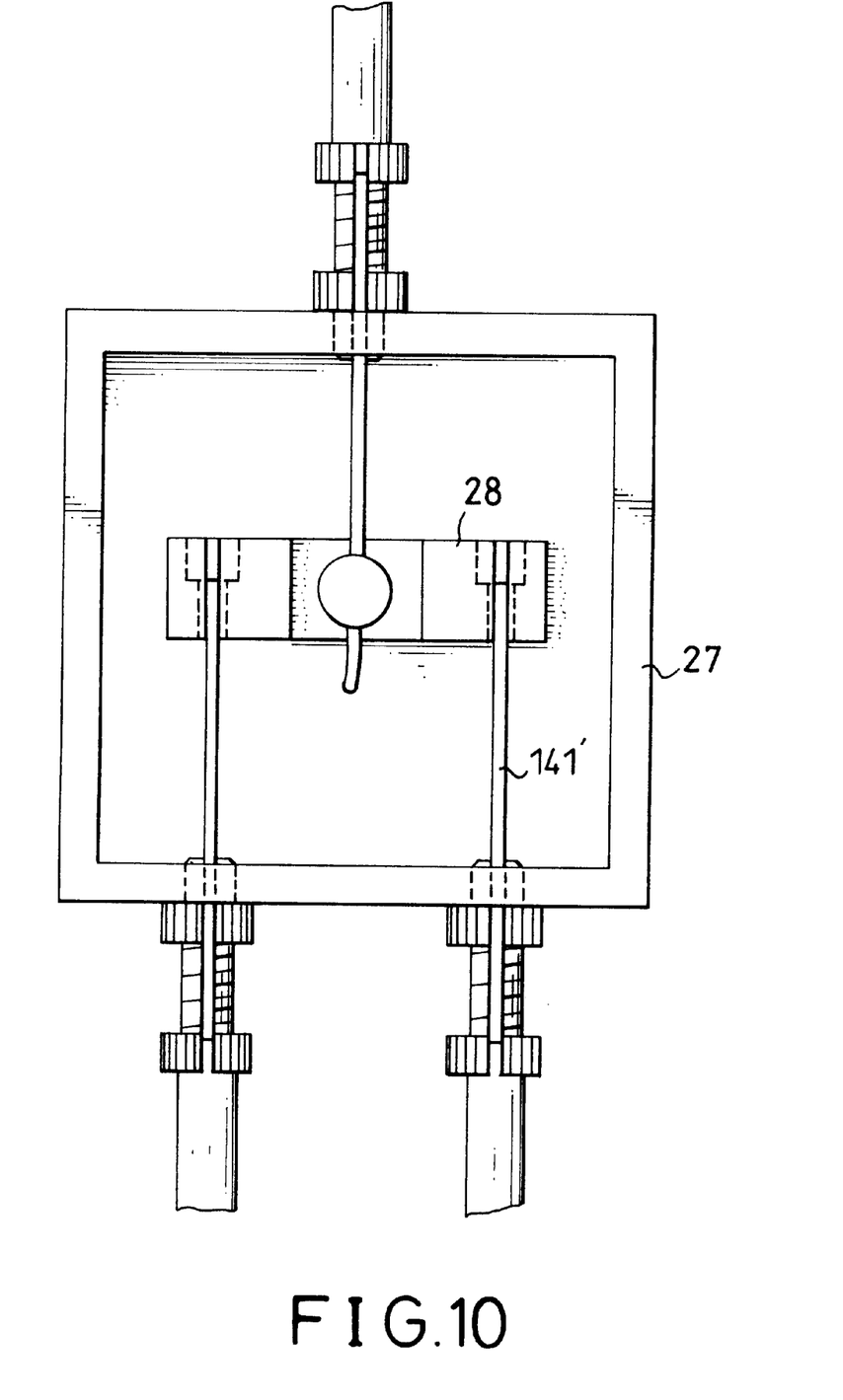
FIG. 10 is a front view showing the assembled brake system in the carriage.

With reference to FIGS. 9 and 10 and taking reference to FIGS. 1 and 1A, each of the braking handles (14) is securely connected to a cord (141) that extends into a control box (27) and then engages with a connector (28). The connector (28) engages with two secondary cords (141') that respectively extend to one of the front wheels (24). To provide braking effect to the pair of rear wheels (41), a second control box (27') is provided. A connector (28') in the control box (27') has two secondary cords (141') that respectively extend to one of the rear wheels (41). With such an arrangement, the braking handles (14) are able to control the brake to the front wheels and/or the rear wheels (24, 41).

Beside the first frame (10), the carriage of the invention further has a second frame (40) pivotally connected to the first frame (10). The first frame (10) has a tube (30) pivotally connected to the second frame (40). The second frame (40) has two tubular extensions (300) respectively extending from opposed sides of the tube (30) to support one of the control boxes (27)

The second frame (40) further has a pair of rear wheels (41) rotatably mounted on opposed sides of the second frame (40) and a platform securely mounted between the pair of rear wheels (41) so as to provide a support to a user standing on the platform (42).

It is concluded that the present has the following advantages:

① the pivotal connection between the first frame and the second frame enables the front and rear wheels of the carriage to engage the ground at all times. It is especially useful when the carriage is operated on a mountainous area and the road is zigzag.

② the steering system enables the user to turn to a desired direction while the user is shifting his center of mass. When operated in a mountainous area, the user's center of mass often shifts due to the changeable paths. Therefore, when the changing of direction is required, the user shifts his center of mass will facilitate the changing of the direction.

③ normally, the differential device in a vehicle is complicated and complex and often involves a lot of gears. The carriage of the invention provides a simple-structured differential device by using a pair of unidirectional bearings to achieve the desired purpose. Therefore, the cost of the carriage is greatly reduced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A carriage comprising:

a first frame having
a cylinder firmly attached to the first frame to rotatably receive therein a shaft whose first end is securely connected to a T-shaped steering bar;
a linkage whose first end is securely connected to a second end of the shaft;
a secondary linkage whose first end is connected to a second end of the linkage by means of a universal joint;
a U-shaped front wheel bracket securely engaged with a second end of the secondary linkage and having a pair of front wheels respectively and rotatably mounted on opposed sides of the front wheel bracket, an inclined support integrally formed with a mediate portion of the front wheel bracket through a cylindrical housing so as to pivotally receive therein a protrusion extending out from the first frame;
a motor securely attached to the first frame and controlled by a control switch that is mounted on the T-shaped steering bar;
an axle rotatably extending through joints of the front wheel bracket and the inclined support and having a gear securely mounted to connect to the motor by means of a chain, to which the front wheels are respectively and rotatably mounted to each free end of the axle;
a battery box received in the first frame to receiving therein multiple batteries; and
a motor regulating device mounted in the first frame for regulating the motor; and
a second frame pivotally connected to the first frame by a tube that is firmly attached to the first frame and having a pair of rear wheels rotatably mounted on opposed sides of the second frame, two tubular extensions extending out from the tube to respectively support a control box; wherein the control box has a pair of cords extending to one of the braking handles on opposed sides of the steering bar so as to enable the user to control the brake to either the front wheels or the rear wheels.

2. The carriage as claimed in claim 1, wherein the universal joint is a cross-head joint.

3. The carriage as claimed in claim 1, wherein a pair of unidirectional bearings are respectively mounted on each free end of the axle to provide a differential effect.

* * * * *